April 27, 1954  A. F. ROTHWEILER  2,676,840
AUTOMOBILE WINDOW VENTILATION MECHANISM
Filed Sept. 30, 1949  2 Sheets-Sheet 1
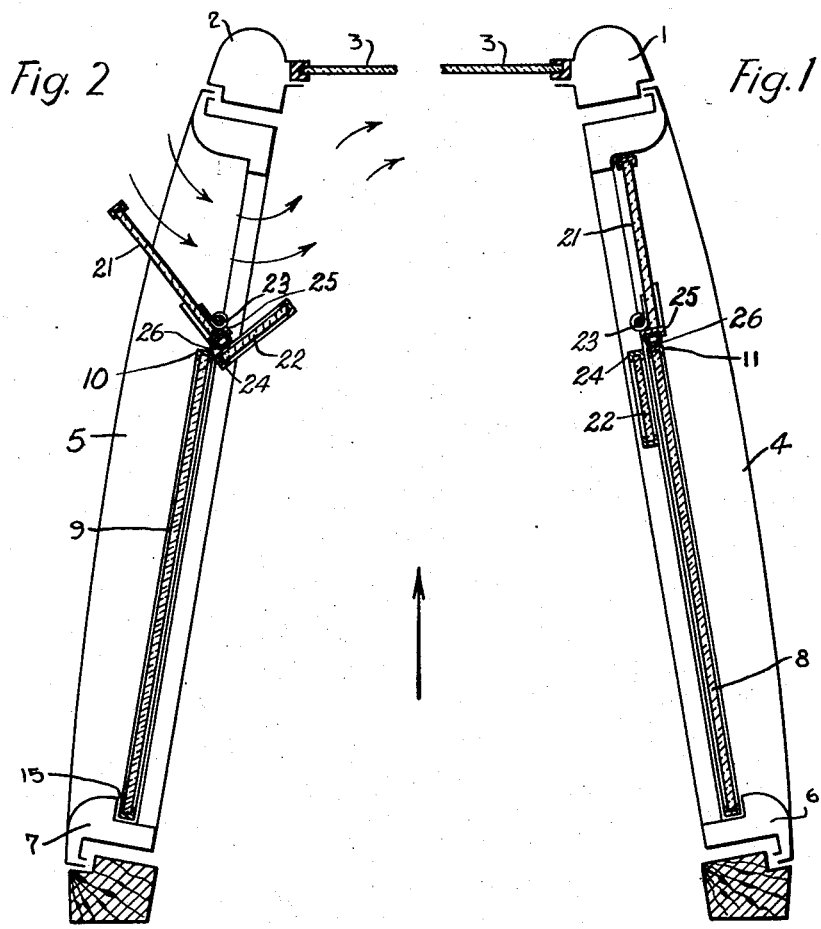
INVENTOR
ALFRED FRIEDR. ROTHWEILER
BY Dicke and Padlon
ATTORNEYS April 27, 1954  A. F. ROTHWEILER  2,676,840
AUTOMOBILE WINDOW VENTILATION MECHANISM
Filed Sept. 30, 1949  2 Sheets-Sheet 2
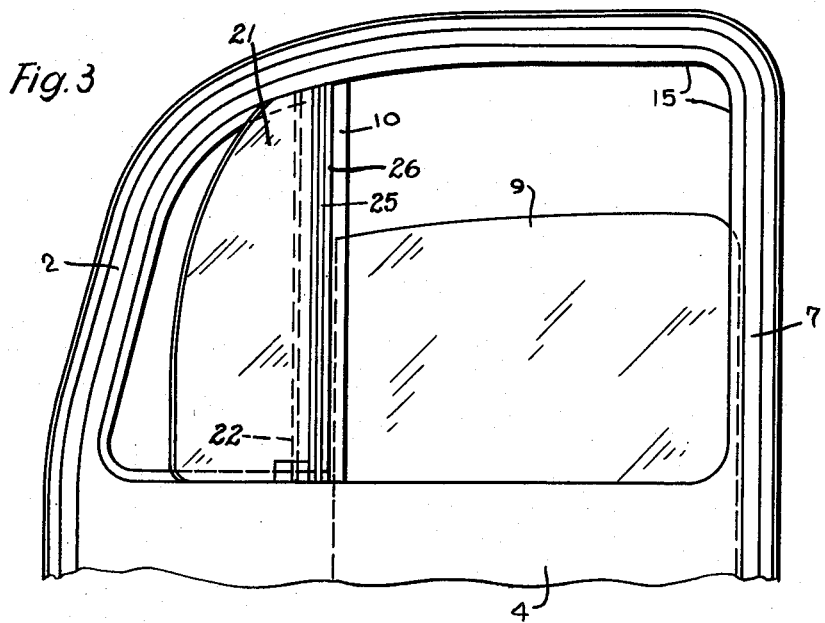
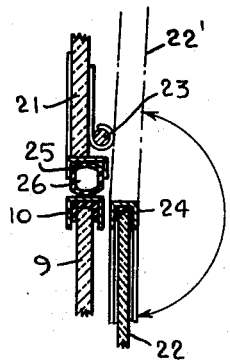
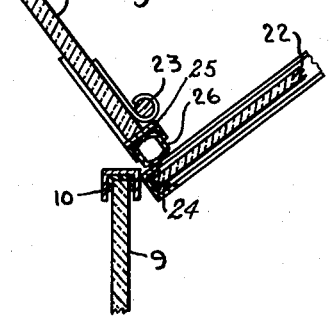
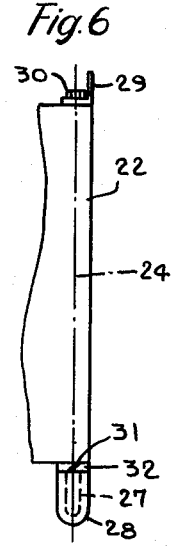
INVENTOR
ALFRED FRIEDR. ROTHWEILER
BY Riche and Padlon
ATTORNEYS Patented Apr. 27, 1954

2,676,840

UNITED STATES PATENT OFFICE 2,676,840

AUTOMOBILE WINDOW VENTILATION MECHANISM

Alfred Friedrich Rothweiler, Oberesslingen, Germany, assignor to Daimler-Benz Aktiengesellschaft, Stuttgart-Unterturkheim, Germany Application September 30, 1949, Serial No. 118,800

Claims priority, application Germany October 1, 1948

11 Claims. (Cl. 296—44)

This invention relates to a window ventilation mechanism, and more particularly to a side window ventilation mechanism for use in motor vehicles. The invention is principally directed to ventilation which is easily controlled, effective and provides freedom from draft for the vehicle's occupants. A characteristic feature of the invention consists in providing a pane directed forwardly and outwardly and another pane directed forwardly and inwardly which may be shorter, serving as a diverting pane so that said panes or wings will form a V-shaped air scoop or air deflector having a V-shaped lateral section, the section plane extending in the driving direction. Both panes suitably revolve about separate axes substantially vertical to the driving direction, so that they may be eventually turned from a closed position to an open one.

The improvement provided by the present invention consists in that the wind caught by the pane opening obliquely to the outside and serving to ventilate the inside of the vehicle, is turned forwardly by the other pane, the turning pane opening obliquely to the inside, thus obviating every kind of draft in the vehicle's interior, though affording efficient ventilation. At the same time the occupants are protected against rain and dust, the window of the inner or diverting pane not obstructing the vision or being available as a blind window dimming the light, if developed accordingly, e. g. in colours. Moreover this window ventilation mechanism is simple and can be operated in a simple way.

A further characteristic feature of one embodiment of the present invention consists in that said panes, either of which is turnable to the outside and the other to the inside, are disposed in such a way that opening the one pane will simultaneously open the other in the opposite direction. In a most simple way this result is eventually obtained by disposing the revolving axes of the two panes so as to be displaced in the driving direction, whereby, for example, the pane opening outwardly extends beyond its turning axis and the prolonged portion of said pane, serving at the same time for tightening, will have contact with the other pane and open it likewise. These revolving panes suitably form the front part of a motor car side window, so as to avert, when opened in a V-shape, the wind in a forward direction towards the windscreen or towards the bottom space lying underneath. Similar mechanisms however may be provided also on the rear side windows of the vehicle or even on its roof, in which latter case the revolving axes eventually provided will extend substantially in a horizontal plane. Further features of the present invention relate to the linkage of the windows, to fixing the panes in the chosen position and to tightening the windows against the window frame.

A preferred embodiment of this invention is represented in the accompanying drawings and described in detail, though the invention does not remain within the scope of this embodiment. The term: "a revolving axis substantially vertical" is intended to include a revolving axis deviating more or less from the vertical position, provided only the result desired by the invention is obtained.

In the drawings:

Figs. 1 and 2 represent in a horizontal longitudinal section the front part of a motor vehicle body having a window ventilation mechanism according to the invention, Fig. 1 showing the revolving panes in the closed position, and Fig. 2 showing them in the opened position.

Fig. 3 is a side view of the window ventilation mechanism as represented in Fig. 2, while Fig. 4 is a horizontal section through the linkage portion of the invention, showing the outer pane closed and the inner pane turned in the opposite direction by 180 degrees.

Fig. 5 represents the same embodiment with the two panes being opened, and

Fig. 6 is a side view of the hinge part of the pane revolving inwardly.

The frame posts 1 and 2 of the front pane or windshield 3 of the automotive vehicle constitute or form part of a frame firmly connected with the walls of the automotive vehicle, each being 4 and 5 respectively. The doors 4 and 5, respectively, are strengthened by frames 6 and 7, respectively, on the rear frame ledge of which the side windows 8 and 9, respectively, can be raised or lowered. On their front edge, both windows 8 and 9 are guided through interposed frame borders 10 and 11 within the window frame 15 of both doors 4 and 5.

In accordance with the present invention, there is shown in the Figures 4, 5 and 6 the above mentioned intermediate frame border 10 for the slidable window 9, 21 the pane turnable outwardly and 22 the pane turnable inwardly. The former is supported in a hinge axis 23, the latter in a hinge axis 24, the two hinge axes being displaced with relation to the driving direction, so that the hinge axis 23 operating the outer pane is somewhat distant from the frame border 10. The pane 21 in this case is prolonged rearwardly beyond the turning axis 23 and provided, towards the frame border 10, with a U-shaped rail 25, serving as a receptacle for a rubber tightening border 26 abutting in the closed position on the frame border 10.

The inner pane 22, as indicated by arrows, can be turned by 180 degrees so that in the one position indicated in Figure 4 in full lines said pane is facing the slidable window in parallelism, while in the other position marked with dotted lines it extends adjacent and in parallelism with the outer pane 21. The inner pane 22 may be hinged to the window frame by means of a bottom pivot 27 resting in a supporting bearing 28 disposed on the window frame. On its top end, said inner pane is supported by an angle iron 29 secured to the window frame and a screw 30. Between the bottom pivot bearing 28 and the abutting surface 31 of the pane there is interposed a circular spring 32 fitted in such a way as to generate friction pressure between the pivot bearing 28 and the pane in the direction of the hinge axis 24. By suitably adjusting or by changing the circular springs any desired friction may be obtained sufficient to fix the pane 22 in any desired position whatever.

If the inner pane 22 is in the position indicated in Fig. 4 by full lines, and the outer pane 21 is turned outwardly, the position of the pane 22 remains unaltered. If however the latter is in the position 22', indicated by dotted lines, turning the pane 21 outwardly will cam the rearward prolonged portion of the last named pane, by means of the rubberized border 26, with the inner pane 22 and pushes it inwardly as represented in Figure 5, the two panes 21 and 22 then forming a V-shaped air-scoop opening forwardly.

For the purpose of ventilating the interior of the vehicle body, one or both outer turnable panes 21 may be turned outwardly and simultaneously the corresponding inner panes 22 are turned inwardly, so that the two panes, as revealed by a horizontal section represented in Figures 2 and 5, will form a V-shaped air scoop or air deflector opening forwardly.

By these means the wind streaming along the side wall of the vehicle body and caught by the outer pane will flow towards the diverting surface and directed inwardly of the inner pane, thus deviating, as indicated in Figure 2 by arrows, forwardly towards the front windshields 3 and towards the bottom space extending underneath. This current of air will result in an efficient ventilation of the vehicle's interior and more particularly in an efficient cooling of the bottom space grown warm, while the space extending behind the turnable windows remains completely free of draft, the occupants at the same time remaining unmolested either by dust or by rain.

The diverting panes or inner panes 22 are suitably also made of glass or of any other transparent material. They may also be colored and/or of such dimensions as to serve in addition as sun protectors.

If the two turnable panes are supported by a common axis, a similar result might be eventually obtained by interposing a reversing gear between the pivots of the outer and the inner pane so that turning the one pane outwardly will automatically turn the other pane inwardly. There may be eventually provided a coupling device to permit disengaging the two panes.

What I claim and desire to protect by Letters Patent is:

1. A window ventilation mechanism for motor vehicles comprising a wall portion having a window opening in the vehicle, a first closure member for a front part of said window opening with respect to the direction of travel, a second closure member for the other part of the window opening in the plane of said first closure member, means for pivotally supporting said first closure member in said wall portion to swing said first closure member outwardly only of said plane around an axis perpendicular to the direction of travel, an inner casement normally parallel to and inwardly of said second closure member along the side thereof, and further means including a shaft situated in said wall portion and perpendicular to the direction of travel for pivotally supporting said inner casement to swing said inner casement inwardly whereby it can form a V which is open towards the front with the outwardly swingable closure member.

2. A window ventilation mechanism for vehicles according to claim 1, in which the two closure members extend over the entire height of the window opening.

3. A window ventilation mechanism according to claim 1 in connection with which the second closure member is vertically movable.

4. A window ventilation mechanism according to claim 1 in which the closure member situated forward in the direction of travel is swingable while the other closure member is vertically movable.

5. A window ventilation mechanism according to claim 1, in which the said two closure members lie in the same plane in their closed position.

6. Window ventilation mechanism according to claim 1, in which the axis of rotation of the inwardly swingable casement is set back towards the inside in the transverse direction of the vehicle with respect to the plane of the first closure member and also with respect to the plane of the second closure member.

7. Window ventilation mechanism according to claim 1, in which the swingable closure member and the inner casement extend, swingable about different axes, close alongside of each other in the forward direction, the axis of rotation of the swingable closure member lying in front of the rearward edge of same, and the axis of rotation of the inner casement is set rearwardly with respect to said rear edge of the swingable closure member.

8. Window ventilation mechanism according to claim 1, in which the inner casement is of less width in a horizontal direction than the swingable closure member.

9. Window ventilation mechanism for vehicles, comprising a window opening in the vehicle, a window column dividing the window opening into two parts, a window part for the closure of one part of the window opening in the plane thereof, a casement for the closure of the other part of the window opening in said plane, means for pivotally supporting said casement in said window opening to swing the front edge of the casement in the direction of travel outwardly only from its normal position in said plane of the window opening, a second casement in a plane parallel to said first-mentioned plane and along the side of said window part facing the interior of the car, and means for pivotally supporting said second casement on the window column to swing said second casement inwardly into a position with respect to the first casement in which the two casements form a V-shaped air deflector which is open towards the front.

10. Window ventilation mechanism according to claim 9, in which the inner casement can be swung out of the V position of the two casements inwardly to a position parallel to the first mentioned window part at the inside thereof.

11. Window ventilating mechanism according to claim 10 in which the axis of rotation of said first-mentioned casement is located in front of the axis of rotation of said second casement, and said first-mentioned casement includes a portion projecting rearwardly beyond its turning axis, said last named portion turning inwardly when the front edge thereof is turned outwardly, thereby coming in contact with said second casement in front of its turning axis so as to turn said second casement inwardly.

References Cited in the file of this patent

UNITED STATES PATENTS

| Number | Name | Date |
|---|---|---|
| 348,085 | Wolf | Aug. 24, 1886 |
| 829,070 | Hansen | Aug. 21, 1906 |
| 1,610,302 | McKittrick | Dec. 14, 1926 |
| 1,757,860 | Hall et al. | May 6, 1930 |
| 1,849,176 | De Fries | Mar. 15, 1932 |
| 2,079,203 | Fagerburg | May 4, 1937 |
| 2,132,422 | Kannel | Oct. 11, 1938 |
| 2,240,790 | Kuney | May 6, 1941 |
| 2,260,403 | Preston | Oct. 28, 1941 |

FOREIGN PATENTS

| Number | Country | Date |
|---|---|---|
| 23,614 | Switzerland | June 2, 1902 |
| 415,220 | Great Britain | Aug. 23, 1934 |
| 705,961 | Germany | May 14, 1941 |